United States Patent
Cho

(10) Patent No.: US 7,536,246 B2
(45) Date of Patent: May 19, 2009

(54) METHOD FOR CONTROLLING VEHICLE

(75) Inventor: Jeong Sik Cho, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 539 days.

(21) Appl. No.: 11/303,224

(22) Filed: Dec. 15, 2005

(65) Prior Publication Data
US 2007/0150145 A1    Jun. 28, 2007

(30) Foreign Application Priority Data
Dec. 9, 2005    (KR) .................. 10-2005-0120953

(51) Int. Cl.
  *B62D 6/04*    (2006.01)
  *G08G 1/09*    (2006.01)
  *G06F 19/00*   (2006.01)
(52) U.S. Cl. .............. 701/41; 701/1; 701/38; 701/47
(58) Field of Classification Search ........ 701/1, 701/41, 48, 29, 38
   See application file for complete search history.

(56) References Cited

U.S. PATENT DOCUMENTS

| | | | | |
|---|---|---|---|---|
| 4,028,673 A | * | 6/1977 | Taylor et al. ............ | 382/100 |
| 5,013,080 A | * | 5/1991 | Garrone et al. .......... | 296/180.1 |
| 5,379,218 A | * | 1/1995 | Jacobi et al. ........... | 701/41 |
| 5,418,723 A | * | 5/1995 | Reichelt et al. ......... | 701/41 |
| 5,508,929 A | * | 4/1996 | Harada .................. | 701/48 |
| 5,925,083 A | * | 7/1999 | Ackermann .............. | 701/41 |
| 6,185,489 B1 | * | 2/2001 | Strickler .............. | 701/29 |
| 6,523,911 B1 | | 2/2003 | Rupp et al. | |

FOREIGN PATENT DOCUMENTS

| | | |
|---|---|---|
| JP | 07-129883 | 8/1994 |
| JP | 06-223568 | 5/1995 |
| KR | 10-1998-015134 | 5/1998 |
| KR | 10-2001-0073016 | 7/2001 |

* cited by examiner

*Primary Examiner*—Tan Q Nguyen
(74) *Attorney, Agent, or Firm*—Edwards Angell Palmer & Dodge LLP; Peter F. Corless

(57) ABSTRACT

Methods and systems for controlling a vehicle are provided which can include advantages of controlling corresponding to lateral wind frequency. Because the vehicle is controlled on the basis of frequency areas and a force of a lateral wind, driving stability of the vehicle and driver comfort can be enhanced.

5 Claims, 2 Drawing Sheets

METHOD FOR CONTROLLING VEHICLE

CROSS-REFERENCE TO RELATED APPLICATION

This application claims priority to and the benefit of Korean Patent Application No. 10-2005-0120953 filed in the Korean Intellectual Property Office on Dec. 09, 2005, the entire contents of which are incorporated herein by reference.

BACKGROUND OF THE INVENTION (a) Field of the Invention

The present invention relates to a methods and systems for controlling a vehicle. More particularly, the present invention relates to methods and systems for controlling a vehicle through frequencies of a lateral wind.

(b) Description of the Related Art

Generally, a vehicle control system controls a vehicle corresponding to outside disturbances of the vehicle.

During driving of a vehicle, a force of lateral wind can operate on the vehicle.

Where the lateral wind is not constant, movement of the vehicle can change, and ride comfort and stability of the vehicle can consequently deteriorate.

Prior vehicle control systems have not considered lateral wind frequency and the non-constant characteristics of lateral wind. As a consequence, where lateral wind acts on a vehicle that employs such a prior vehicle control system, the vehicle stability and ride comfort can be compromised.

In addition, in a case where the frequency of the lateral wind is 1.5 Hz, a problem can occur where the force of the lateral wind is weighted according to the force of the lateral wind with a force of a vehicle control.

The information set forth in this Background of the Invention section is only for enhancement of understanding of the invention and should not be taken as an acknowledgement or any form of suggestion that this information forms the prior art that is already known to a person skilled in the art.

SUMMARY OF THE INVENTION

The present invention provides methods and systems for controlling a vehicle which can include advantages of controlling corresponding to lateral wind frequency.

In one aspect, the invention includes methods for controlling a vehicle movement, the methods suitably comprising: detecting a frequency of a lateral wind acting on a vehicle; applying one or more predetermined modes corresponding to the frequency of the lateral wind; and operating a vehicle dynamics control system (VDCS) and/or an electronic power steering (EPS) apparatus.

An exemplary method for controlling a vehicle movement according to a preferred embodiment of the present invention includes: detecting at least one parameter, including a frequency of a lateral wind that is acting on a vehicle; applying one or more predetermined modes corresponding to the frequency of the lateral wind; and operating a vehicle dynamics control system (VDCS) or an electronic power steering (EPS) apparatus corresponding to the one or more predetermined modes.

In preferred aspects, the at least one parameter includes a force of the lateral wind and the method for controlling a vehicle movement further includes: determining if the force of the lateral wind is more than a first predetermined value; determining if the force of the lateral wind is more than a second predetermined value, which second predetermined value is more than the first predetermined value, in a case where the detected force of the lateral wind is more than the first predetermined value; and operating an impact mode which operates only the VDCS in a case that the detected force of the lateral wind is more than the second predetermined value.

A preferred method for controlling a vehicle movement includes detecting at least one parameter in a case where the detected force of the lateral wind is less than the first predetermined value.

A preferred method for controlling a vehicle movement may further include determining the frequency of the lateral wind in a case where the detected force of the lateral wind is less than the second predetermined value.

The one or more predetermined modes include a static mode operating the vehicle dynamics control system in a case where the frequency is less than a particular value such as 0.5 Hz, a non-static mode operating the vehicle dynamics control system and the electronic power steering apparatus simultaneously in a case that the frequency is in a particular range e.g. from 0.5 to 2.0 Hz, and a high-frequency mode operating the electronic power steering apparatus in a case that the frequency is more than a particular value e.g. more than 2.0 Hz.

A preferred method for controlling a vehicle movement may further include displaying on a display device a mode to be applied just before the predetermined mode is applied.

The invention also includes vehicle control systems that can conduct methods described herein. In particular, a preferred vehicle control system of the invention may suitably comprise: (a) apparatus to detect a frequency of a lateral wind acting on a vehicle; (b) apparatus to apply one or more predetermined modes corresponding to the frequency of the lateral wind; and (c) a vehicle dynamics control system (VDCS) and/or an electronic power steering (EPS) apparatus.

Also provides are vehicles that comprises such a vehicle control system. Further provided are vehicles that can conduct a method as described herein.

It is understood that the term "vehicle" or "vehicular" or other similar terms as used herein is inclusive of motor vehicles in general such as passenger automobiles including sports utility vehicles (SUV), buses, trucks, various commercial vehicles, and the like.

Other aspects of the invention are discussed below.

DESCRIPTION OF REFERENCE NUMERALS INDICATING PRIMARY ELEMENTS IN THE DRAWINGS

100: piezoelectric sensor
101: control unit
103: vehicle dynamics control system
105: electronic power steering apparatus

DETAILED DESCRIPTION

As discussed above, in one aspect, the invention includes methods for controlling a vehicle movement, the methods suitably comprising: detecting a frequency of a lateral wind acting on a vehicle; applying one or more predetermined modes corresponding to the frequency of the lateral wind; and operating a vehicle dynamics control system (VDCS) and/or an electronic power steering (EPS) apparatus.

In another preferred aspect, the invention includes a vehicle movement control system suitably comprising: (a) apparatus to detect a frequency of a lateral wind acting on a vehicle; (b) apparatus to apply one or more predetermined modes corresponding to the frequency of the lateral wind; and (c) a vehicle dynamics control system (VDCS) and/or an electronic power steering (EPS) apparatus.

An exemplary embodiment of the present invention will hereinafter be described in detail with reference to the accompanying drawings.

Figure 1:
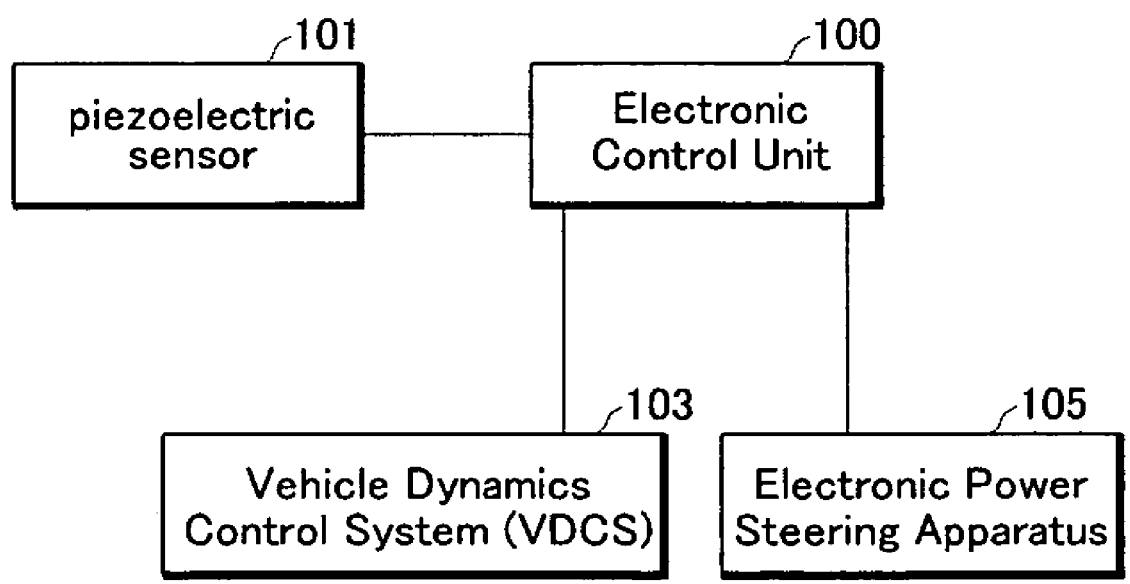
FIG. 1 shows a vehicle control system that can operate a method for controlling a vehicle according to an exemplary embodiment of the present invention.
Figure 2:
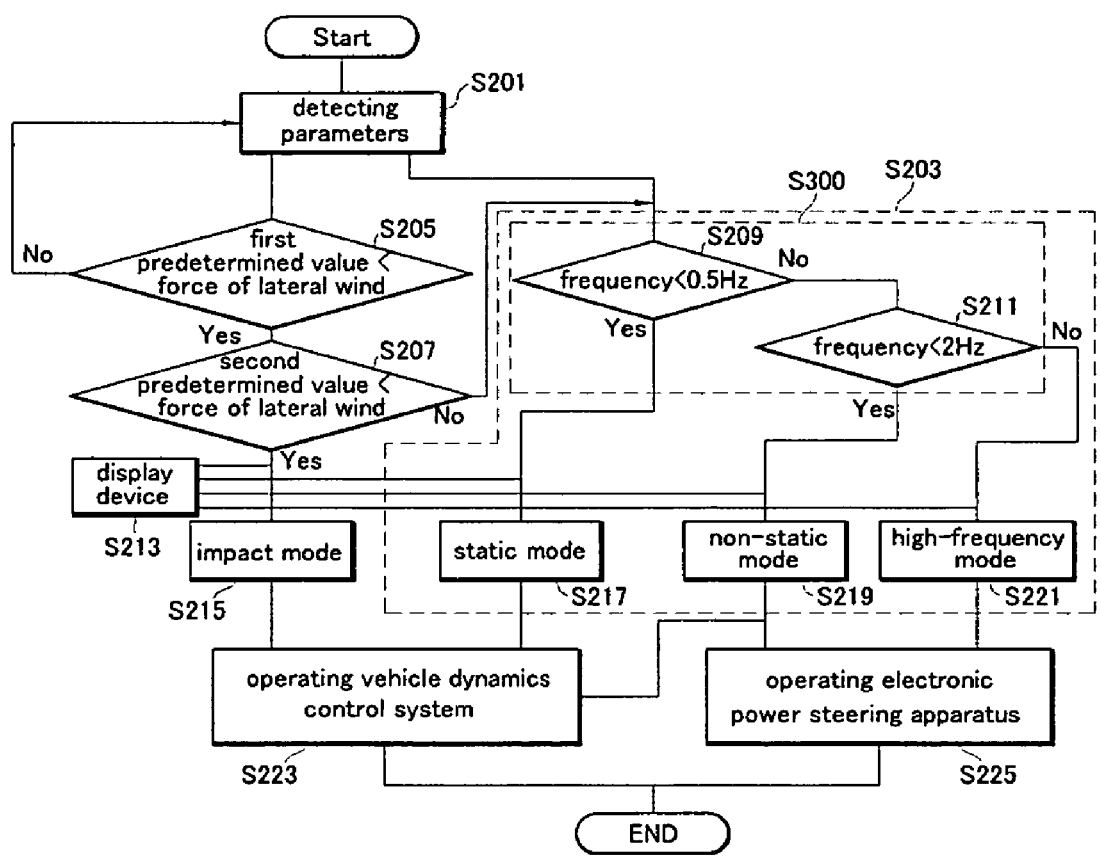
FIG. 2 is a flowchart showing a method for controlling a vehicle according to an exemplary embodiment of the present invention.

FIG. 1 shows a vehicle control system that can operate a method for controlling a vehicle according to an exemplary preferred embodiment of the present invention and FIG. 2 is a flowchart showing a method for controlling a vehicle according to an exemplary preferred embodiment of the present invention.

As shown in FIG. 1, a vehicle control system that can operate a method for controlling a vehicle according to an exemplary preferred embodiment of the present invention suitably includes a piezoelectric sensor 101, a control unit 100, a vehicle dynamics control system (VDCS) 103, and an electronic power steering (EPS) apparatus 105.

The piezoelectric sensor 101 is for determining a frequency of the lateral wind and according to the exemplary embodiment of the present invention, a plurality of piezoelectric sensors are employed and in particularly preferred systems three piezoelectric sensors are employed.

As generally referred to herein, the frequency of the lateral wind means a native frequency of the lateral wind. Through the use of a plurality of piezoelectric sensors, the piezoelectric sensor 101 can effectively measure lateral wind characteristics such as speed and direction of the lateral wind.

For example, in the exemplary embodiment of the present invention, the piezoelectric sensors 101 may be disposed to a front wheel of the vehicle, a hood, and a bumper, or other locations on the vehicle.

The control unit 100 suitably may comprise at least one microprocessor operated by a predetermined program and the predetermined program can be programmed to include a set of instructions to perform steps in a method according to the exemplary embodiment of the present invention, as described herein.

The vehicle dynamics control system 103 and the electronic power steering apparatus 105 are utilized in customary manner in the methods and systems of the present invention, as understood from the present disclosure.

Referring now to FIG. 2, an exemplary preferred embodiment of the present invention for controlling a vehicle by controlling a movement of the vehicle is described.

First, the control unit 100 detects at least one parameter including a frequency of the lateral wind acting on the vehicle at step S201.

At this step, the frequency of the lateral wind can be suitably measured by the piezoelectric sensor 101 whereby the at least one parameter includes the speed and direction of the lateral wind.

Thereafter, the control unit 100 applies a predetermined mode corresponding to the measured frequency of the lateral wind at step S203.

That is, the predetermined mode is predetermined by respective frequency areas of the lateral wind.

Then, the control unit 100 operates the vehicle dynamics control system or the electronic power steering apparatus corresponding to the one or more predetermined modes such that the lateral wind does not undesirably affect the vehicle.

Still in reference to FIG. 2, the control unit 100 can detect a force of the lateral wind when the control unit 100 detects the one or more parameters.

After the control unit 100 detects at least one parameter at the step S201, the control unit 100 determines if the force of the lateral wind is more than a first predetermined value at step S205.

The first predetermined value suitably means a minimum value at which the force of the lateral wind can affect the vehicle and the first predetermined value may differ in value with differing types of vehicles.

Thereafter, control unit 100 determines if the force of the lateral wind is more than a second predetermined value, which is more than the first predetermined value, in a case where the detected force of the lateral wind is more than the first predetermined value at step S207.

The second predetermined value is suitably a force of the lateral wind in a case where the force of the lateral wind can unexpectedly affect the vehicle and the second predetermined value may differ in value with differing types of vehicles.

Therefore, the first predetermined value and the second predetermined value may have different values depending on the kinds or types of vehicle.

If the force of the detected lateral wind is less than the first predetermined value, the control unit 100 operates the step S201 that is detecting the lateral wind.

The control unit 100 suitably operates an impact mode that operates only the VDCS in a case where the detected force of the lateral wind is more than the second predetermined value at step 215.

At the impact mode, the control unit 100 suitably operates only the vehicle dynamics control system 103 at step S223.

In this case, the control unit 100 operates only the vehicle dynamics control system 103 by considering only the force of the lateral wind acted on the vehicle.

That is, a motion of the vehicle is controlled by considering a dynamic characteristic of the vehicle. As is understood, the dynamic characteristic of the vehicle relates to a suspension of the vehicle.

Therefore, thought the preferred systems of the invention, in a case where a lateral wind having a relatively large force suddenly acts on a vehicle (e.g. a strong wind gust), the motion of the vehicle can be stably controlled.

In a case where the detected force of the lateral wind is less than the second predetermined value, the control unit 100 determines the frequency of the lateral wind at step S300.

The step S300, which determines the frequency of the lateral wind, includes a step S209 determining if the frequency of the lateral wind is less than a particular value such as 0.5 Hz and a step S211 determining if the frequency of the lateral wind is more than a particular value such as 2 Hz.

If the frequency of the lateral wind is less than the particular value such as 0.5 Hz, the control unit 100 applies a static mode at step S217.

At the static mode, the control unit 100 operates the vehicle dynamics control system 103 at step S223.

In this case, the control unit 100 determines that the frequency of the lateral wind is constant and maintains the motion of the vehicle by operating the vehicle dynamics control system 103.

If the frequency of the lateral wind is more than the particular value such as 0.5 Hz, the control unit 100 determines that the frequency of the lateral wind is more than 2 Hz at step S211.

And then, if the control unit 100 determines that the frequency of the lateral wind is less than a particular value such as 2 Hz, the control unit 100 applies a non-static mode at step S219.

At the non-static mode, the control unit 100 operates the vehicle dynamics control system 103 and the electronic power steering apparatus 105 simultaneously at steps S223 and S225.

The non-static mode means that the control unit 100 determines that the frequency of the lateral wind is not constant.

If the control unit 100 determines that frequency of the lateral wind is more than the particular value such as 2 Hz, the control unit 100 applies a high-frequency mode at step S221.

At the high-frequency mode, the control unit 100 operates the electronic power steering apparatus 105 at step S225.

In this case, because the frequency of the lateral wind is high, the control unit 100 operates the electronic power steering apparatus such that a steering wheel is operated by a force that is comparatively strong.

The described exemplary frequencies of the lateral wind, i.e., 0.5 Hz and 2.0 Hz will differ for particular vehicles and are predetermined for a particular vehicle with consideration of various factors such as kind of vehicle, a vehicle weight, and the dynamic characteristic.

Therefore, it should be clear that the values 0.5 Hz and 2.0 Hz are exemplary and may be changed and selected based on consideration of such factors.

Control unit 100 also may suitably display the mode to be applied to a display device before (preferably just before) the predetermined mode is applied at step S213.

Therefore, a driver of the vehicle can recognize which mode has been applied and a state of the lateral wind.

According to the exemplary embodiment of the present invention, because different modes are applied corresponding to the frequency and the force of the lateral wind, the motion of the vehicle can be stably controlled and the ride comfort can be enhanced.

In addition, systems of the invention can be cost effective and generally do not involve further apparatus other than the piezoelectric sensor.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling a vehicle movement, comprising:
    detecting at least one parameter, including a frequency of a lateral wind acting on a vehicle, and wherein the at least one parameter comprises a force of the lateral wind;
    applying one or more predetermined modes corresponding to the frequency of the lateral wind;
    operating a vehicle dynamics control system (VDCS) or an electronic power steering (EPS) apparatus corresponding to the one or more predetermined modes;
    determining if the force of the lateral wind is more than a first predetermined value;
    determining if the force of the lateral wind is more than a second predetermined value, which is more than the first predetermined value, in a case that the detected force of the lateral wind is more than the first predetermined value; and
    operating an impact mode which operates only the VDCS in a case where the detected force of the lateral wind is more than the second predetermined value.

2. The method of claim 1,
    wherein, in a case where the detected force of the lateral wind is less than the first predetermined value, the detecting of the at least one parameter is performed again.

3. The method of claim 1,
    wherein, in a case where the detected force of the lateral wind is less than the second predetermined value, determining the frequency of the lateral wind.

4. The method of claim 1,
    wherein the predetermined modes comprise:
    a static mode operating the vehicle dynamics control system in a case where the frequency is less than 0.5 Hz;
    a non-static mode operating the vehicle dynamics control system and the electronic power steering apparatus simultaneously in a case where the frequency is from 0.5 to 2.0 Hz; and
    a high-frequency mode operating the electronic power steering apparatus in a case where the frequency is more than 2.0 Hz.

5. The method of claim 4,
    further comprising displaying on a display device a mode to be applied just before the predetermined mode is applied.

* * * * *